United States Patent [19]

Ho

[11] Patent Number: 6,147,862
[45] Date of Patent: Nov. 14, 2000

[54] QUICK-DETACHABLE COMPUTER HOUSING

[76] Inventor: Hsin Chien Ho, 20F-1, 268, Sec. 1, Wen-Hua Rd., Pan Chiao City, Taipei, Taiwan

[21] Appl. No.: 09/140,697

[22] Filed: Aug. 26, 1998

[51] Int. Cl.[7] .................................................. G06F 1/16
[52] U.S. Cl. ......................... 361/685; 361/684; 361/724; 312/223.2
[58] Field of Search .................................. 361/685, 684, 361/724; 312/223.2

[56] References Cited

U.S. PATENT DOCUMENTS

| | | | |
|---|---|---|---|
| 5,398,161 | 3/1995 | Roy | 361/685 |
| 5,680,294 | 10/1997 | Stora et al. | 361/695 |
| 5,768,099 | 6/1998 | Radloff et al. | 361/685 |
| 5,921,644 | 7/1999 | Brunel et al. | 312/223.2 |
| 5,934,775 | 8/1999 | Ho | 312/223.2 |
| 5,940,265 | 8/1999 | Ho | 361/685 |
| 5,944,398 | 8/1999 | Wu | 312/223.2 |
| 5,980,003 | 11/1999 | Huang | 312/223.2 |
| 5,995,364 | 11/1999 | McAnally et al. | 361/685 |
| 6,018,457 | 6/1998 | Mroz | 361/685 |
| 6,052,277 | 4/2000 | Liu et al. | 361/685 |
| 6,055,152 | 4/2000 | Felcman et al. | 312/223.2 |

*Primary Examiner*—Leo P. Picard
*Assistant Examiner*—John Reed
*Attorney, Agent, or Firm*—Dougherty & Troxell

[57] ABSTRACT

A quick-detachable computer housing includes a mainframe shell separated by an upright partition board into a mother board chamber for holding a mother board and a circuit board for interface card at the mother board and a power chamber for holding a power supply device, an upright front panel detachably fastened to a front side of the mainframe shell by screws, a face panel covered on the upright front panel, a bridge frame detachably fastened to the upright front panel inside the mother board chamber by screws, a locating frame detachably hooked on the bridge frame top hold a hard diskdrive, and a CD-ROM rack hung on the bridge frame and secured in place by a screw to hold a CD-ROM player.

1 Claim, 5 Drawing Sheets

QUICK-DETACHABLE COMPUTER HOUSING

BACKGROUND OF THE INVENTION

The present invention relates to a computer housing for a personal computer. and more particularly to a quick-detachable computer housing convenient for maintenance.

A regular computer housing is generally comprised of a mainframe shell holding a mother board, a power supply device and other necessary component parts, a frame assembly fixedly fastened the mainframe shell on the inside to hold a hard diskdrive, a floppy diskdrive and a CD-ROM player. In case a part of the computer housing is damaged it is difficult to detach the damaged part from the computer housing for a repair work or replacement.

SUMMARY OF THE INVENTION

The present invention provides a quick-detachable computer housing which allows the user to conveniently quickly dismount the parts of the computer housing for a maintenance work. According to the preferred embodiment of the present invention, the quick-detachable computer housing comprises a mainframe shell separated by an upright partition board into a mother board chamber for holding a mother board and a circuit board for interface card at the mother board and a power chamber for holding a power supply device an upright front panel detachably fastened to a front side of the mainframe shell by screws a face panel covered on the upright front panel, a bridge frame detachably fastened to the upright front panel inside the mother board chamber by screws, a locating frame detachably hooked on the bridge frame top hold a hard diskdrive, and a CD-ROM rack hung on the bridge frame and secured in place by a screw to hold a CD-ROM player.

DETAILED DESCRIPTION OF THE PREFERRED EMBODIMENT

Figure 1:
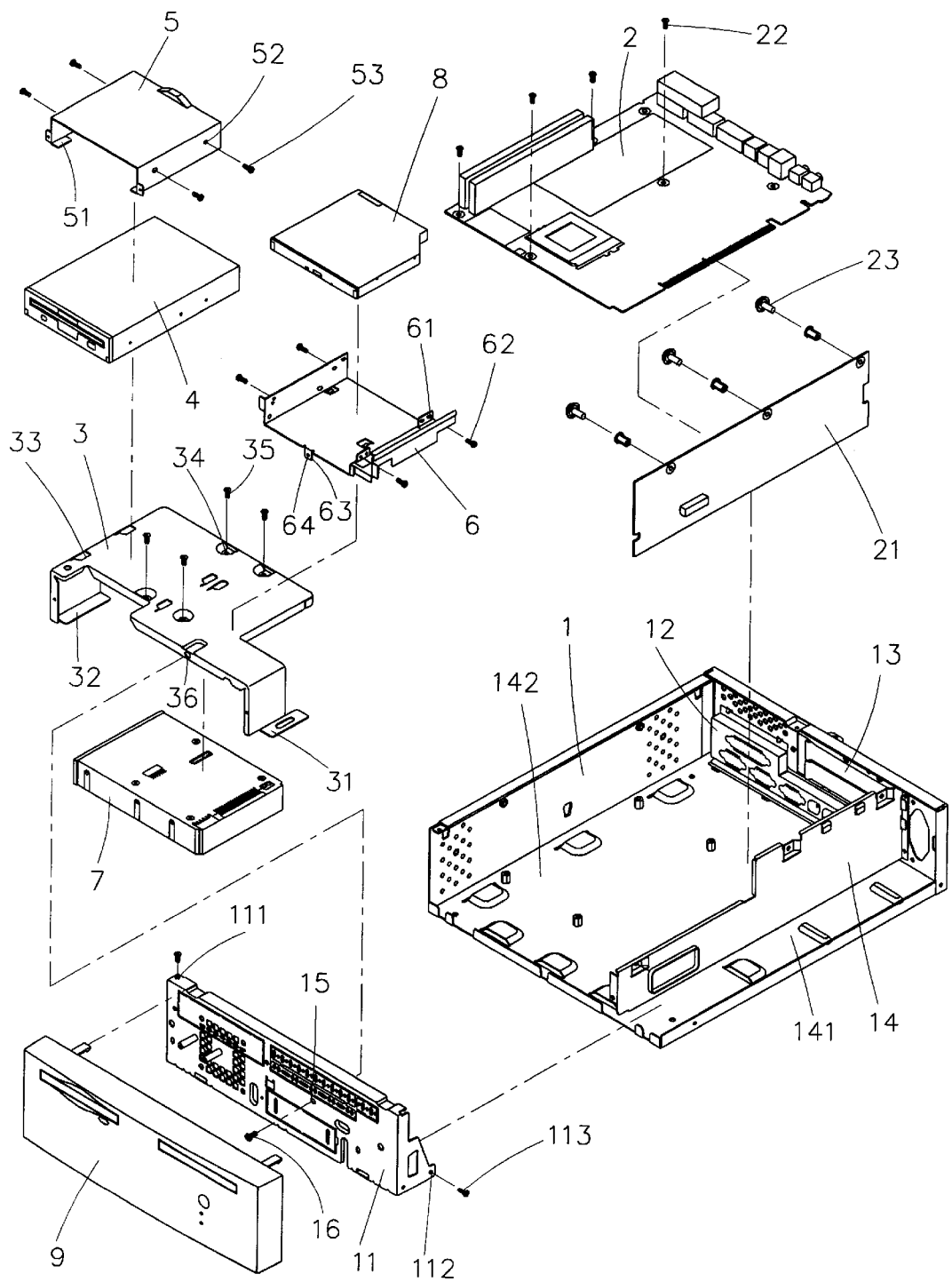
FIG. 1 is an exploded view of a quick-detachable computer housing according to the present invention.
Figure 2:
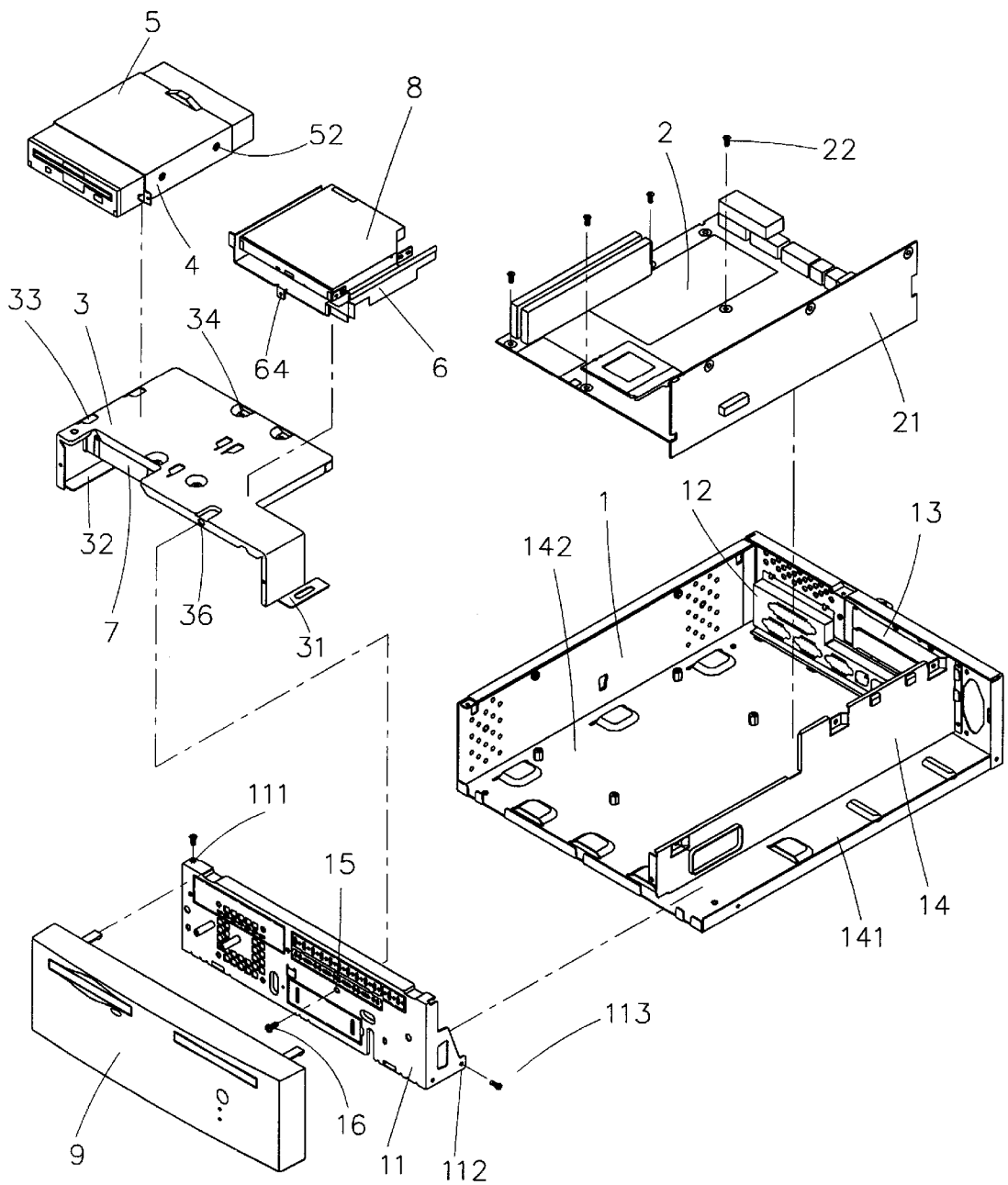
FIG. 2 illustrates the locating frame and the floppy diskdrive fastened together the CD-ROM rack and the CD-ROM player fastened together the mother board and the circuit board for interface card fastened together according to the present invention.

Referring to FIGS. 1 and 2, a quick-detachable computer housing in accordance with the present invention comprises a mainframe shell, a mother board unit, and a diskdrive unit. The mainframe shell, referenced by 1 comprises a detachable upright front panel 11 having top screw holes 111 and side screw holes 112, a terminal holder 12 and an interface card holder 13 provided at the upright rear panel thereof and an upright partition board 14, which separates the holding space of the mainframe shell 1 into a power chamber 141 for holding a power supply device and a mother board chamber 142 for holding the mother board unit and the diskdrive unit. The mother board unit is mounted in the mother board chamber 142 inside the mainframe shell 1, comprised of a mother board 2 and a circuit board for interface card 21 fastened to the mother board 2 at one side. The mother board 2 is fixedly fastened to the bottom wall of the mainframe shell I inside the mother board chamber 142 by screws 22. The circuit board for interface card 21 is fixedly fastened to one side of the upright partition board 14 within the mother board chamber 142 by screws 23. When a top cover shell (not shown) is covered on the mainframe shell 1, the upright partition board 14 supports the top cover shell, enabling the top cover shell to support a monitor.

Figure 3:
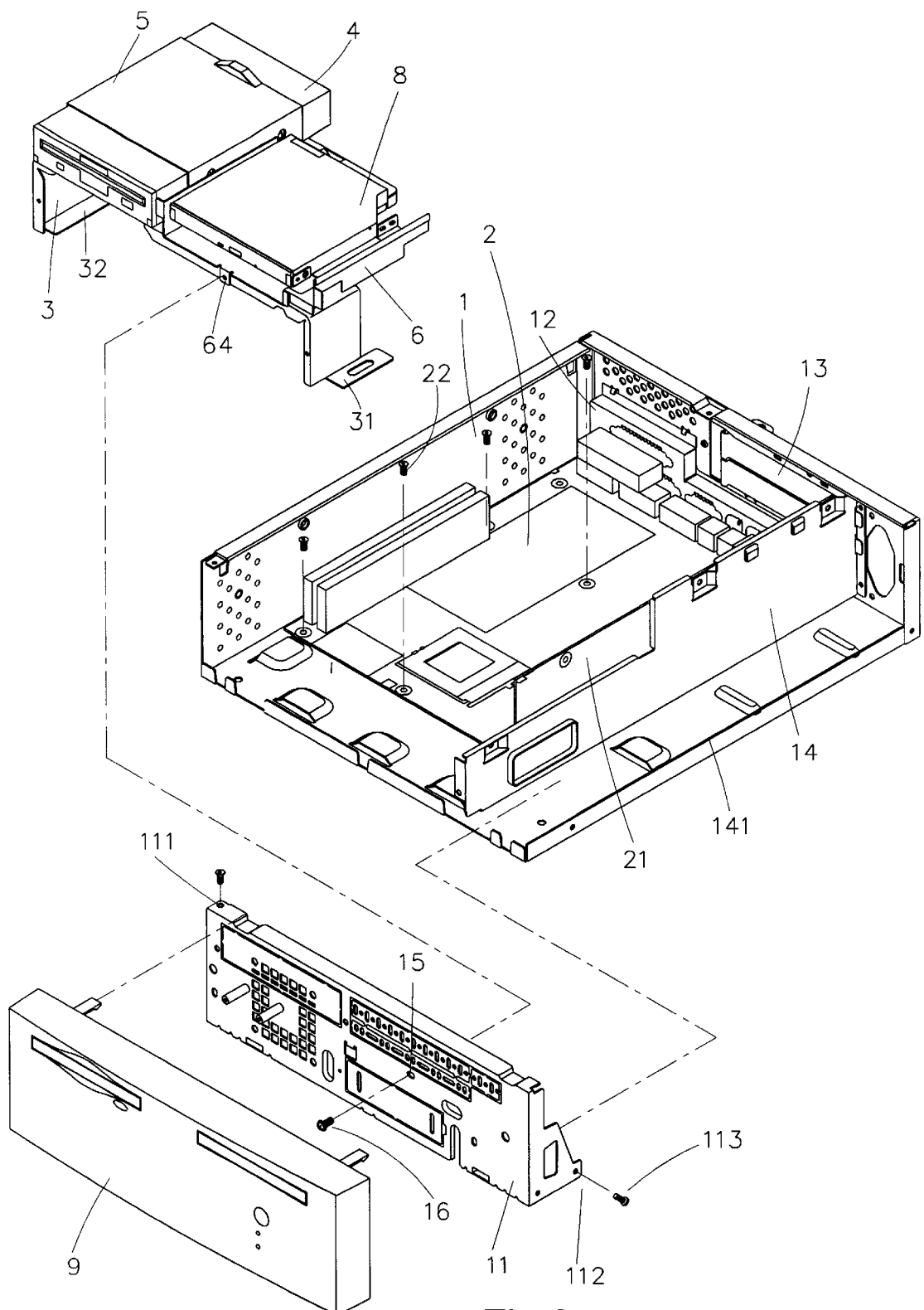
FIG. 3 illustrates the mother board unit installed in the mainframe shell the diskdrive unit assembled according to the present invention.
Figure 4:
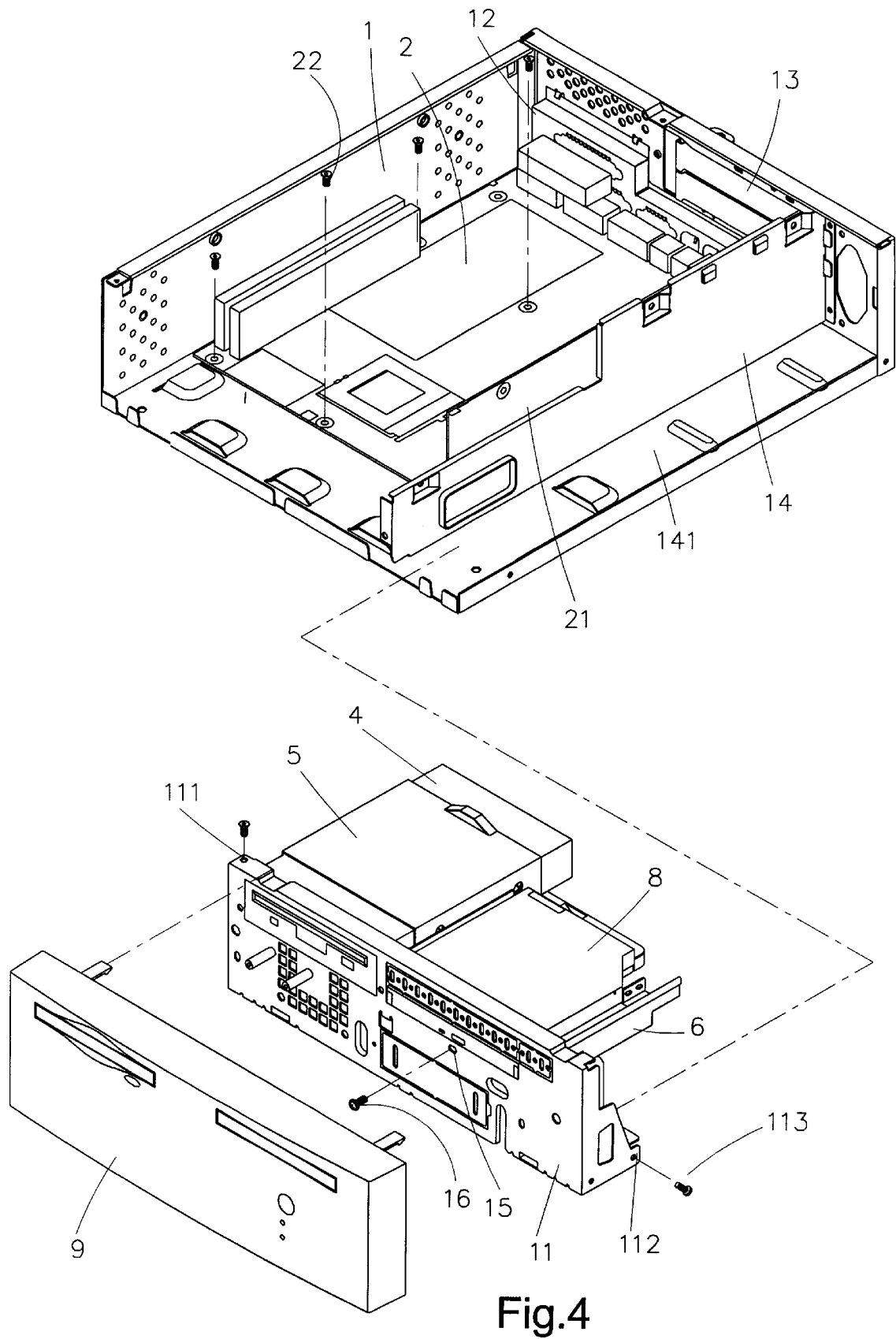
FIG. 4 illustrates the diskdrive unit and the upright front panel fastened together.

Referring to FIGS. 3 and FIGS. 1 and 2 again, the diskdrive unit comprises a bridge frame 3, a floppy diskdrive 4, a locating frame 5, a CD-ROM rack 6, a hard diskdrive 7, a CD-ROM player 8, and a face panel 9. The bridge frame 3 comprises two mounting flanges 31,32 bilaterally disposed at the bottom side and respectively fastened to the front panel 11, symmetrical pairs of retaining holes 33 provided at the top side thereof, and a plurality of top mounting holes 34. The hard diskdrive 7 is mounted inside the bridge frame 3, and fixedly fastened to the top mounting holes 34 by screws 35. The locating frame 5 comprises two coupling flanges 51 bilaterally disposed at the bottom and respectively forced into engagement with the retaining holes 33 at the bridge frame 3, and symmetrical pairs of mounting holes 52 at two opposite vertical side walls thereof. The floppy diskdrive 4 is mounted inside the locating frame 5 above the bridge frame 3, and fixedly fastened to the mounting holes 52 between the two opposite vertical side walls of the locating frame 5 by screws 53. The CD-ROM player 8 is carried on the CD-ROM rack 6 and fixedly fastened to holes 61 at the CD-ROM rack 6 by screws 62. The CD-ROM rack 6 is mounted on the bridge frame 3 at one side of the locating frame 5, having a downwardly extended front lug 63. The lug 63 has a screw hole 64 connected between a hole 15 on the front panel 11 and a front hole 36 on the bridge frame 3 by a screw 16. After the diskdrive unit and the front panel 11 have been fastened together (see FIG. 4), screws 113 are mounted in the screw holes 111,112 to secure the front panel 11 to the mainframe shell 1, and then the face panel 9 is covered on the front panel 11.

Figure 5:
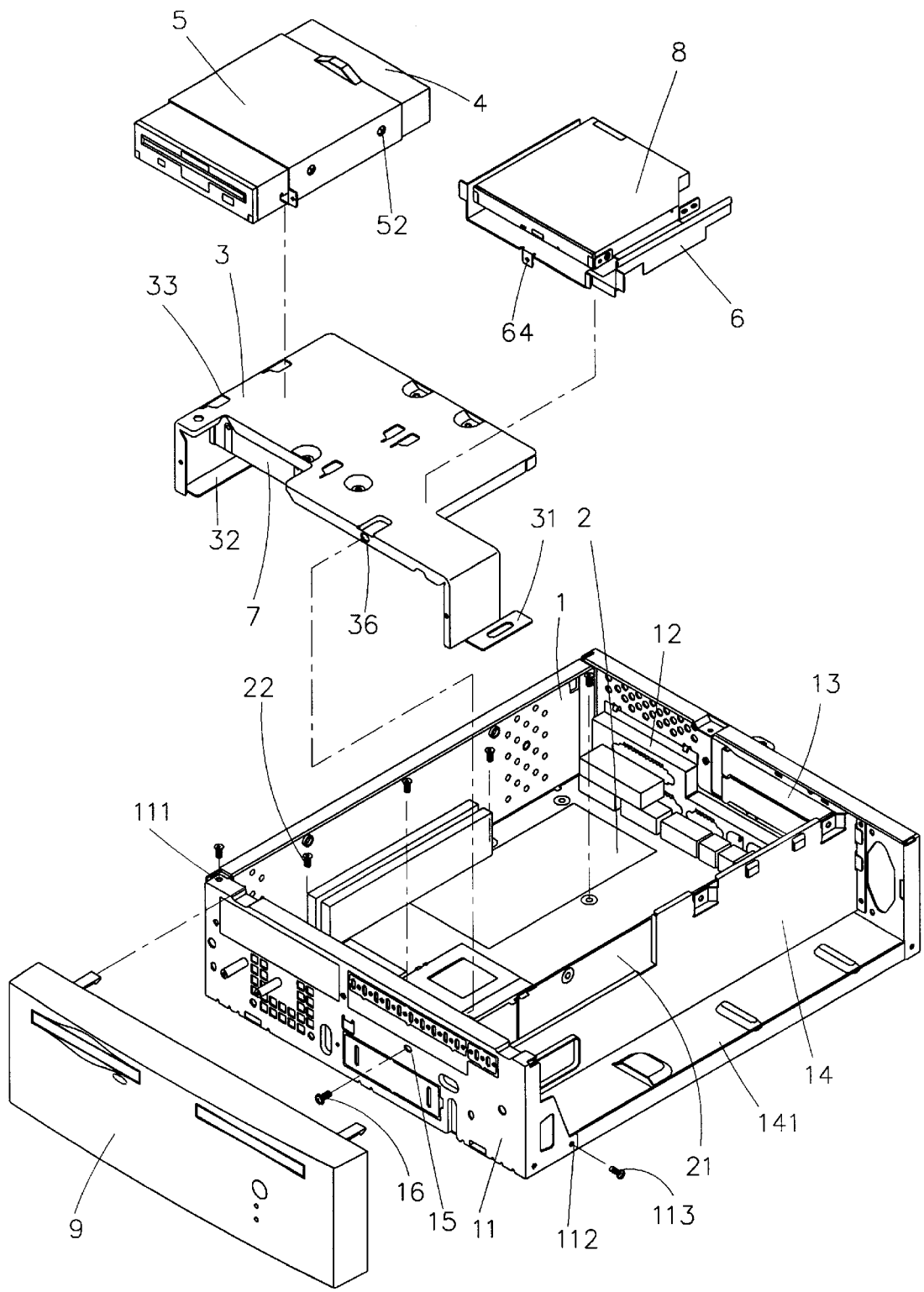
FIG. 5 illustrates the upright front panel fastened to the mainframe shell, the floppy diskdrive and the locating frame fastened together the CD-ROM rack and the CD-ROM player fastened together according to the present invention.

Referring to FIG. 5 the front panel 11 can be fastened to the mainframe shell 1 before the installation of the bridge frame 3 in it. When the top cover shell is opened, interface cards can be directly installed in the mother board unit and the diskdrive unit can be detached from the mainframe shell 1 for a repair work.

While only one embodiment of the present invention has been shown and described, it will be understood that various modifications and changes could be made thereunto without departing from the spirit and scope of the invention disclosed.

What the invention claimed is:

1. A quick-detachable computer housing comprising:
a mainframe shell, said mainframe shell comprising an upright rear panel, a terminal holder and an interface card holder respectively mounted on said upright rear panel, an upright front panel detachably fastened to a front side thereof by screws, an upright partition board connected between said upright rear panel and said upright front panel, a power chamber and a mother board chamber defined therein and separated by said upright partition board, said upright front panel having a mounting hole;

a mother board unit mounted in the mother board chamber inside said mainframe shell, said mother board unit comprising a mother board mounted inside said mother board chamber and fixed thereto by screws, and a circuit board for interface card raised from said mother board at one side and fixed to said upright partition board by screws;

a diskdrive unit fastened to said upright front panel inside said mother board chamber, said diskdrive unit comprising a bridge frame, a floppy diskdrive, a locating frame, a CD-ROM rack, a hard diskdrive, a CD-ROM player, and a face panel, said bridge frame comprising two mounting flanges bilaterally disposed at a bottom side and respectively fastened to said upright front panel, symmetrical pairs of retaining holes provided at a top side thereof, a plurality of top mounting holes, and a front mounting hole, said hard diskdrive being mounted inside said bridge frame and fixedly fastened to the top mounting holes on said bridge frame by screws said locating frame comprising two coupling flanges bilaterally disposed at a bottom side and respectively forced into engagement with the retaining holes at said bridge frame and symmetrical pairs of mounting holes at two opposite vertical side walls thereof, said floppy diskdrive being mounted inside said locating frame above said bridge frame and fixedly fastened to the mounting holes between the two opposite vertical side walls of said locating frame by screws, said CD-ROM player being carried on said CD-ROM rack and fixedly fastened to said CD-ROM rack by screws, said CD-ROM rack being mounted on said bridge frame at one side of said locating frame and having a downwardly extended front lug connected between said upright front panel and said bridge frame, the front lug of said CD-ROM rack having a screw hole connected between the mounting hole on said upright front panel and the front mounting hole on said bridge frame by a screw, said face panel being covered on said upright front panel of said mainframe shell.

\* \* \* \* \*